July 8, 1930.  L. OLIPHANT  1,770,341
HYDRAULIC BACK PRESSURE GAS VALVE
Filed May 26, 1922
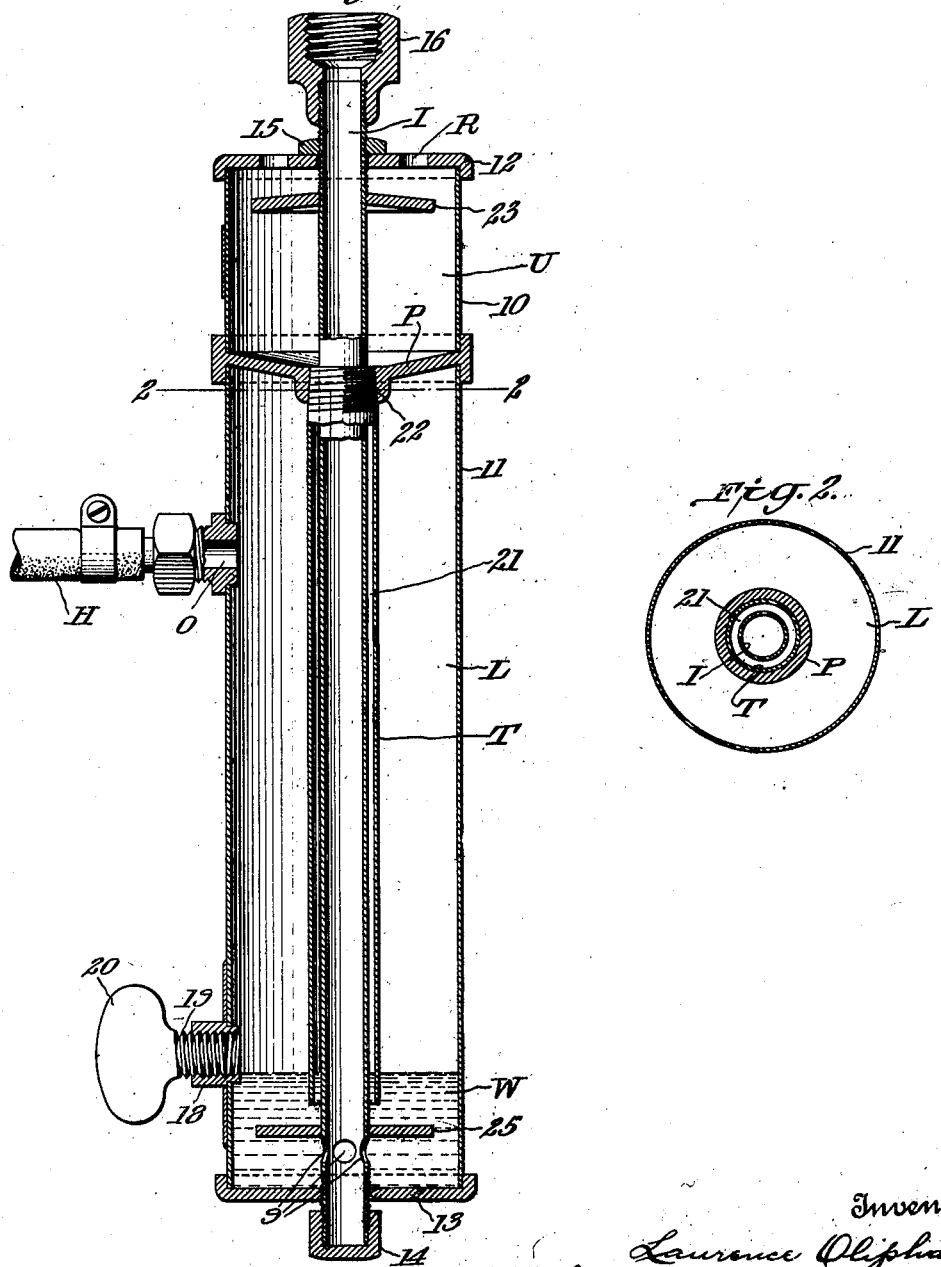

Patented July 8, 1930

1,770,341

UNITED STATES PATENT OFFICE

LAURENCE OLIPHANT, OF TRENTON, NEW JERSEY, ASSIGNOR TO OXWELD ACETYLENE COMPANY, A CORPORATION OF WEST VIRGINIA

HYDRAULIC BACK-PRESSURE GAS VALVE

Application filed May 26, 1922. Serial No. 563,843.

This invention relates to an improved hydraulic back pressure gas valve for use principally in connection with metal heating, welding and cutting blowpipes to prevent oxygen or air from backing into the lower pressure fuel-gas supply line, as in case of accidental stoppage of the blowpipe tip, and to prevent blowpipe flash-backs from entering the fuel-gas supply line.

Fundamentally, this invention follows the one disclosed in United States Patent No. 1,108,863 in which the oxygen or air that backs into the valve builds up a pressure which is vented to the atmosphere at a predetermined pressure through a gas relief passage normally sealed by a liquid column in the valve. During this venting the fuel-gas supply pipe is sealed by the liquid column and after venting the liquid seal is automatically restored to again seal the pressure relief passage.

Separate tubes are provided in the valve of the aforesaid patent to relieve the pressure and to return the liquid entrained by the vented gas to restore the seal. The primary object of the present invention is to simplify the prior construction described and thereby provide a very satisfactory but less expensive valve. The principal feature of this invention consists in the replacement of the aforesaid separate tubes by a single tube that serves the two-fold purpose of a gas vent and a liquid return passage. The objects and novel features of this invention will be apparent from the following description taken with the drawings in which Fig. 1 is a central longitudinal sectional view of a back pressure valve embodying this invention, and Fig. 2 is a transverse sectional view of the same, taken along the line 2—2 of Fig. 1.

As shown in the drawings, the valve has a main or lower chamber L and an auxiliary or upper chamber U, such chambers being separated by a partition P. Fuel gas, such as acetylene, city gas and the like, may enter the lower chamber through suitable inlet means, as by a gas inlet tube I which has one or more holes or inlets 9; and the gas may flow out of the valve through an outlet O to the gas-consuming means, e. g., a blowpipe. To prevent backfire and reverse flow of gas through the valve to the gas supply line feeding to the tube I, the chamber is constructed to contain a column of suitable liquid W, such as water or kerosene, which has its level at a predetermined height above the inlets 9. When such backfire or reverse flow of gas builds up a pressure in the valve, liquid rises in the tube I and also in the tube I and keeps them sealed, and at a predetermined pressure the entrance of a vent tube T is uncovered by the depression of the liquid level, permitting the escape of gas from the chamber L until equilibrium is restored in the valve. The gas thus vented carries out some sealing liquid which, if lost, would in time render the seal and valve ineffective, so this entrained liquid is intercepted in the upper chamber U and returned to the lower chamber through the vent tube; the latter thus constituting a combined pressure-relief and liquid-return tube.

In the advantageous embodiment of the invention illustrated in the drawings, the casing of the improved valve comprises axially alined upper and lower tubular sections 10 and 11 secured to the partition P, and closed by end caps 12 and 13. The inlet tube I extends centrally through the entire casing and may have threaded ends fitting and projecting through threaded holes in the end caps 12 and 13. The lower outer end of the tube I may be closed by a cap 14 that may be removable for drainage purposes, and a lock nut 15 may be fitted on the upper outer threaded part of the tube I to draw the casing sections and caps together. The upper outer threaded end of the tube I is also adapted for connection to a fuel-gas supply line, as by means of the coupling 16. The inlet holes 9 may be near the inner side of the cap 13, and the gas outlet O may be at a suitable distance above the gas inlets 9 and in a nipple secured in an opening in the casing section 11 and to which a hose connection H may be coupled.

The level of the liquid column W is desirably maintained at about the level of the lower part of the bushing 18 that is secured in the casing section 11 to provide a filling opening, which is normally closed by a plug 19. Ordinarily, liquid level plugs in such valves require a wrench for removal, and precautions in maintaining an adequate column of liquid in the valve are often neglected because a suitable tool is not handy to manipulate such a plug. In the improved valve, the plug 19 has a wing head 20 that provides a hand grip and is an important safety feature, making it possible for an attendant to very readily inspect and properly fill the valve with liquid.

The lower end of the improved vent tube T communicates with or opens into the compartment L a short distance above the inlets 9 but is normally sealed by the liquid column in this compartment. The tube T is desirably surrounds and is concentric with the inlet tube I, providing an annular passage 21 between these tubes that extends to an opening in the central lowest part of the partition P to which the upper end of the tube T is joined, as by threads 22. When back-fire or back-pressure builds up a predetermined pressure in the chamber L, the lower end of the tube T will be uncovered and relieve such pressure by allowing the escape of gas through the passage 21 in the tube T into the chamber U which communicates with the atmosphere through the openings R in the end cap 12.

Some liquid is carried through the tube T with the vented gas and, in order to prevent the loss of all this liquid, it is intercepted in the chamber U and returns through the same tube T to the chamber L when the back pressure has been relieved. At the same time, the liquid that has been forced up into the tube I also returns to the chamber L, the normal liquid level restoring and covering the lower end of the vent T. Liquid carried up through the passage 21 may be intercepted by a baffle plate 23 secured to the tube I with its central part directly above the passage 21 so that the stream of liquid-carrying vented gas will meet equal baffle areas on all sides and the liquid will be more completely precipitated onto the partition P, which may be dish-shaped as shown to better conduct this liquid into the upper end of the passage 21. The baffle 23 may be circular, of greater extent than the part of the cap 12 that contains the holes R, and of inverted dish shape. In order that fuel-gas entering the compartment L through the inlets 9 shall be prevented from bubbling straight up and out through the passage 21, a deflector plate 25 is arranged between the inlets 9 and the lower end of the passage 21. This deflector may be circular and centrally secured to the tube I, as shown. Solder or other suitable securing means may of course be employed to unite the various parts of the valve and provide gas and liquid tight joints where desired.

While the invention is shown and described in detail it will be understood that numerous changes may be made in the valve disclosed without departing from the spirit of the invention.

I claim:—

1. A hydraulic back pressure gas valve comprising a chamber having a gas outlet, a gas inlet tube adapted to be sealed by liquid in said chamber to prevent reverse flow of gas, and a vent tube surrounding said inlet tube and normally also sealed by such liquid at the bottom and open to the atmosphere at the top.

2. A hydraulic back pressure gas valve comprising a casing having two compartments separated by a partition, the main compartment having a gas outlet, a gas inlet tube having its inlet in said main compartment adapted to be sealed by liquid, and a vent tube communicating with the main compartment above the inlet of said inlet tube but normally sealed by such liquid, said vent tube being secured to said partition and surrounding said inlet tube and also providing a return passage for liquid carried into the other compartment by vented gas.

3. A hydraulic back pressure gas valve comprising a casing having upper and lower compartments separated by a partition, the lower compartment having a gas outlet, a gas inlet tube extending centrally through said compartments and said partition and having its inlet in the lower compartment adapted to be sealed by liquid to prevent reverse flow of gas, a vent tube concentric with said inlet tube and communicating with both compartments, said vent tube being normally sealed by such liquid and having its upper end secured to said partition, and a baffle plate mounted on said inlet tube centrally above said vent tube.

4. A hydraulic back pressure gas valve comprising a casing having upper and lower compartments separated by a partition, the lower compartment having a gas outlet and the upper compartment having gas relief outlet means, a gas inlet tube extending centrally through said casing and secured to the opposite ends thereof and having its outlet in the lower compartment adapted to be sealed by liquid to prevent reverse flow of gas, a combined gas-vent and liquid-return tube extending along said gas inlet tube and communicating with the upper compartment and also with the lower compartment above the outlet of said inlet tube but normally also sealed by such liquid, a deflector mounted on the inlet tube between the outlet of said inlet tube and the inlet of said vent tube with its central part opposite the latter inlet, and a baffle mounted on the inlet tube with its central part above the upper end of the vent tube.

In testimony whereof, I affix my signature.

LAURENCE OLIPHANT.